United States Patent [19]
Bornhorst

[11] Patent Number: 5,774,273
[45] Date of Patent: Jun. 30, 1998

[54] VARIABLE-GEOMETRY LIQUID-FILLED LENS APPARATUS AND METHOD FOR CONTROLLING THE ENERGY DISTRIBUTION OF A LIGHT BEAM

[75] Inventor: James M. Bornhorst, Desoto, Tex.

[73] Assignee: Vari-Lite, Inc., Dallas, Tex.

[21] Appl. No.: 702,785

[22] Filed: Aug. 23, 1996

[51] Int. Cl.$^6$ .................................................. G02B 1/06
[52] U.S. Cl. ........................................ 359/665; 359/666
[58] Field of Search ................................... 359/665, 666, 359/667, 619, 708, 741; 351/41, 158, 159, 210, 168

[56] References Cited

U.S. PATENT DOCUMENTS

| | | | |
|---|---|---|---|
| 2,300,251 | 10/1942 | Flint | 88/57 |
| 3,161,718 | 12/1964 | Luca | 88/55 |
| 3,738,734 | 6/1973 | Tait et al. | 350/179 |
| 4,466,706 | 8/1984 | Lamothe, II | 350/419 |
| 4,890,903 | 1/1990 | Treisman et al. | 350/419 |
| 5,042,911 | 8/1991 | Levin | 359/619 |
| 5,182,585 | 1/1993 | Stoner | 351/41 |
| 5,436,766 | 7/1995 | Leary | 359/665 |
| 5,537,171 | 7/1996 | Ogino et al. | 353/122 |

Primary Examiner—Frank G. Font
Assistant Examiner—Michael P. Stafira
Attorney, Agent, or Firm—Morgan & Finnegan, L.L.P.

[57] ABSTRACT

A variable-geometry lens controlling the distribution of light in a beam, having a deformable, transparent membrane supported by a liquid-filled, transparent multi-cellular structure forming an array of variable-power lenslets for controlling the divergence or convergence of a light beam. An optically clear liquid is pumped into or out of the structure to deform the membrane into an array of convex or concave lenslets having adjustable optical power to control energy distribution. The index of refraction of the structure matches the index of refraction of the liquid to render the structure invisible so that it has no effect on the beam. The shape of the cells and the curvature of the membrane covering the cell affects the distribution of light refracted by the array of lenslets. The thickness of the membrane may vary across each cell to further affect the curvature and distribution of light refracted by the array of lenslets. The variable-geometry lens may be formed of a single piece of flexible, transparent material incorporating both the deformable membrane and the multi-cellular supporting structure bonded to a flat or curved glass plate. The variable-geometry lens may also be formed of two pieces of flexible, transparent material each incorporating both the deformable membrane and the multi-cellular supporting structure, and bonded together such that lenslets are formed on both sides.

37 Claims, 13 Drawing Sheets

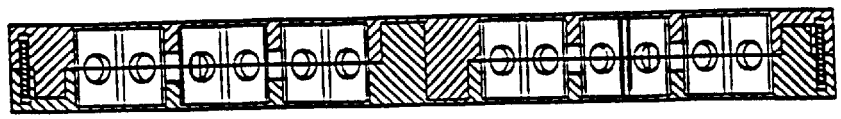
FIG.13
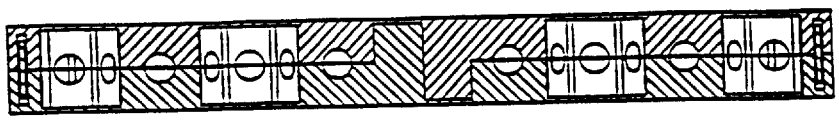
FIG.14
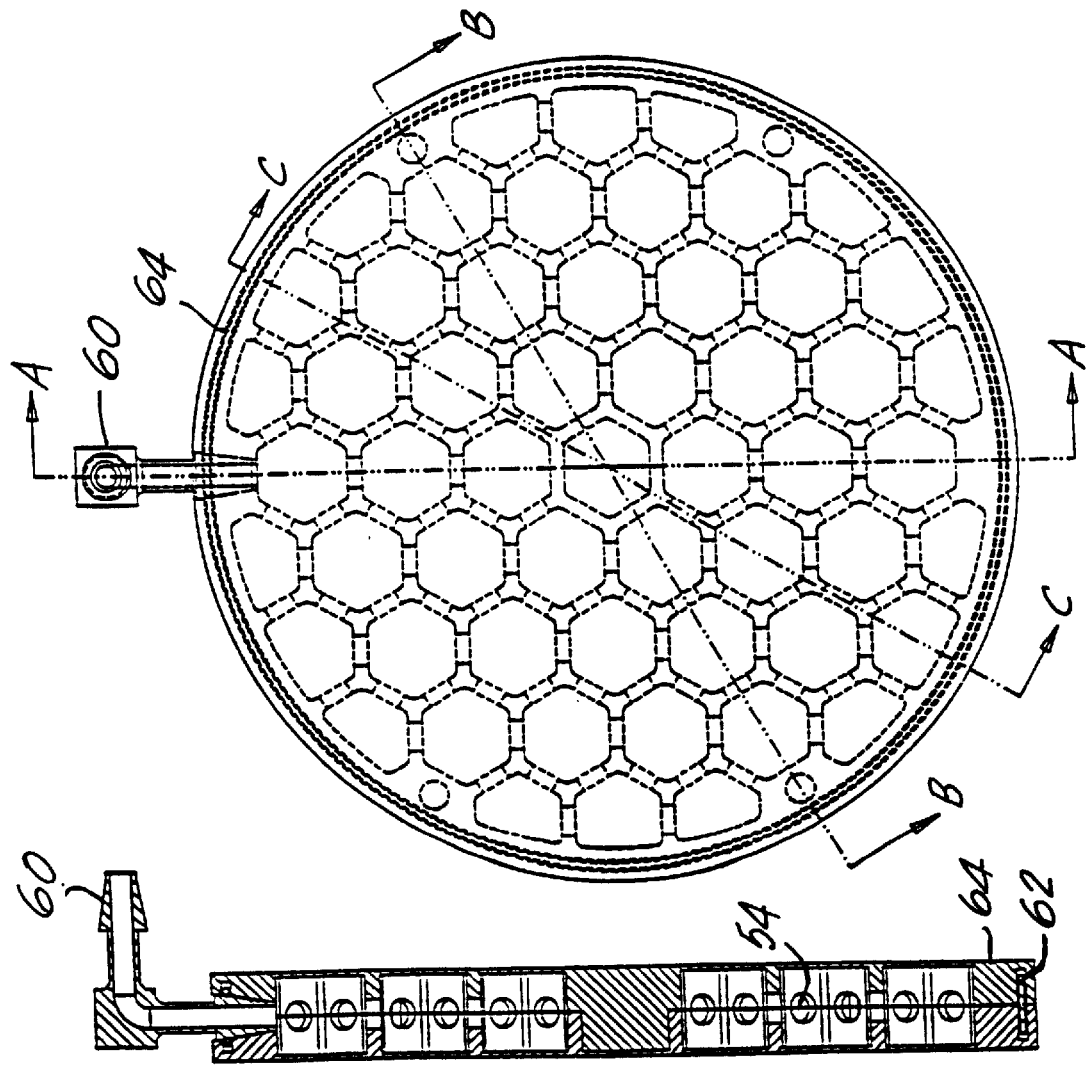
FIG.11
FIG.12

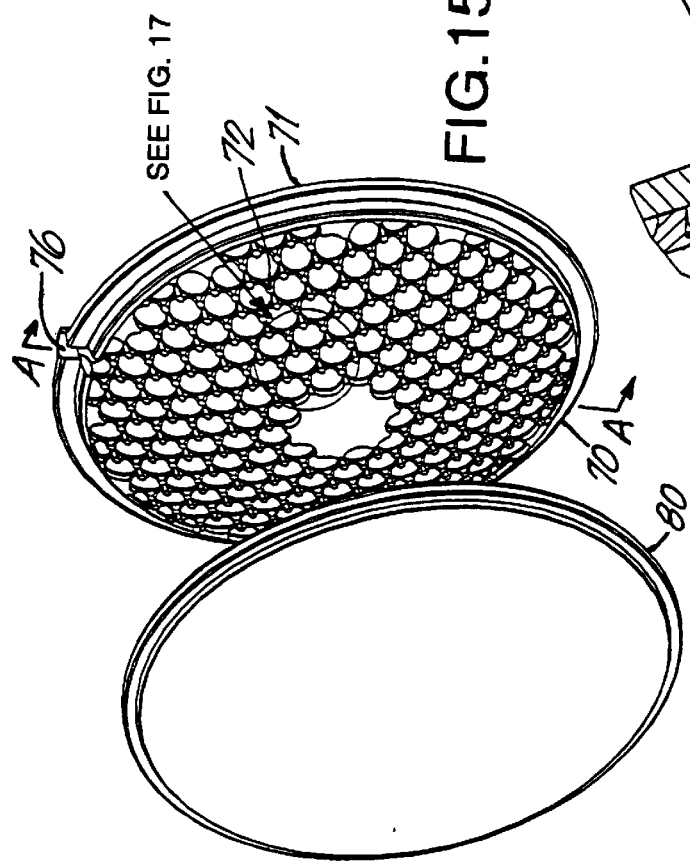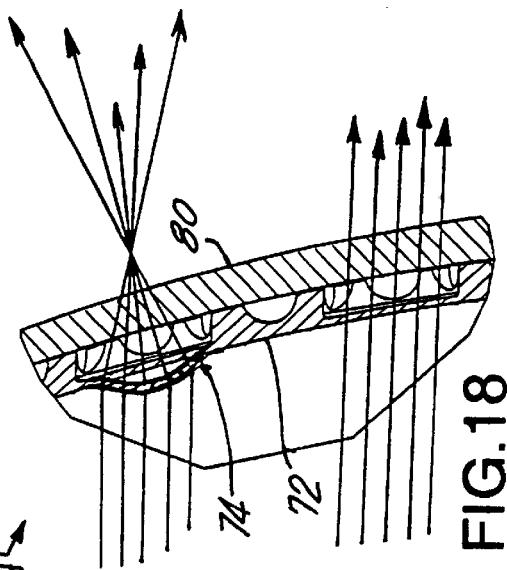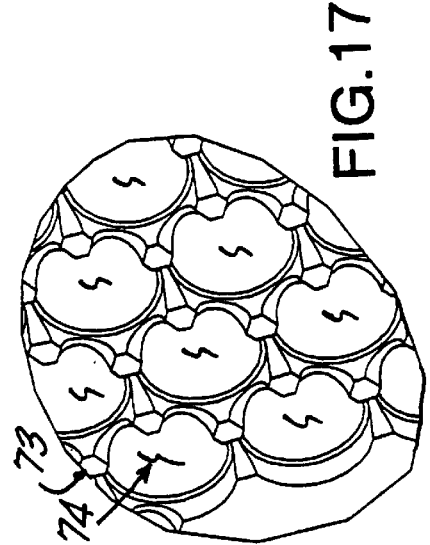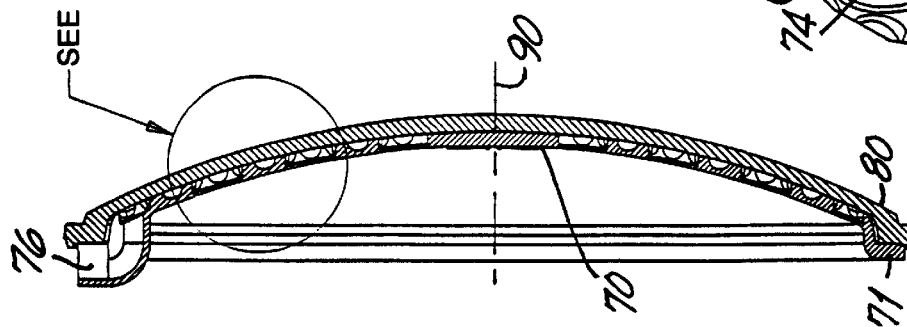

VARIABLE-GEOMETRY LIQUID-FILLED LENS APPARATUS AND METHOD FOR CONTROLLING THE ENERGY DISTRIBUTION OF A LIGHT BEAM

TECHNICAL FIELD OF THE INVENTION

The present invention relates to lighting instruments, and especially devices for controlling light beam divergence or convergence of wash luminaires used in theatrical and architectural illumination.

BACKGROUND OF THE INVENTION

The art of illumination has been greatly advanced in the recent past by systems in which many parameters of a light beam projected by a luminaire can be varied by remote control, including the direction of the projected beam with respect to a pan and tilt axis and the shape, divergence, color and intensity of the beam. Such systems frequently include optical components such as lenses, color changers, dousers, dimmers, and diffusers. Owing to the number of components required to produce the various lighting effects, the size and weight of sophisticated automated luminaires tend to increase disadvantageously.

Automated luminaires also include within their housings motorized mechanisms for varying the many parameters. For example, a motorized yoke assembly may be used for adjusting the pan and tilt of the lamp housing; motorized mechanisms may be used for moving color filters for adjusting the color of the light beam; and lenses and other beam shaping devices coupled to motorized mechanisms may be used for adjusting the size and shape of the light beam. Control electronics responsive to control signal inputs may also be included within the lamp housing and/or the motorized yoke assembly. Bornhorst U.S. Pat. No. 4,392,187 describes a system which has been found to work well in actual practice. In all modern theatrical luminaires, and especially with respect to automated luminaires with pan and tilt heads, a consistent design goal has been to decrease luminaire size, weight and operating noise while increasing the number of functions which can be performed and the range of variability of the function.

In the stage lighting field, it is often necessary to expand the light beam from a wash luminaire to illuminate a broad area. A wash luminaire can produce such an effect using a light source and a spherical reflector which are moveable with respect to a lens. The divergence angle of the light beam varies depending upon the position of the source and reflector with respect to the lens.

Two popular variable-divergence luminaires, the Cadenza PC manufactured by Rank Strand of the United Kingdom and the 2KW Fresnel manufactured by Mole-Richardson of California and others, use the same optical system to control the divergence angle of the light beam projected by the luminaire. The system consists of a positive, or convex, front lens illuminated by a lamp and retroreflector combination. The retroreflector serves to collect and redirect energy that is radiated backwards from the lamp and return it forward to the filament area thereby increasing the apparent brightness of the source. The lamp and reflector combination are moveable along the optical axis of the lens. The Cadenza luminaire uses a normal plano-convex lens, while the 2KW Fresnel luminaire uses a common molded glass Fresnel form of the plano-convex lens.

When the lamp is placed at the focus of the convex lens, a relatively columnar light beam emerges from the luminaire and projects a small spot of light. As the lamp and reflector combination are moved in either direction away from the focus of the lens, the beam diverges from columnar to project a larger spot of light. The system is quite large, requiring many inches of travel for the lamp and reflector combination along the optical axis of the lens. The carrier mechanism, providing the range of motion for the lamp and reflector, is difficult to fabricate because of the weight of the components that must be moved and because of the very high temperatures generated by a typical 2KW lamp. The carrier mechanism is typically manually adjustable. The large glass front lens, typically eight to ten inches in diameter, is thick and heavy even with the significant weight reduction gained by the Fresnel design used by Mole-Richardson.

Another common system for controlling the divergence angle of a light beam is disclosed in U.S. Pat. No. 4,602,321; and uses a lamp which is moveable with respect to a parabolic reflector. When the lamp is placed at the focus of the reflector, a relatively columnar light beam emerges and projects a small spot of light. As the lamp is moved rearwardly along the optical axis of the reflector and away from the focus of the reflector, the beam diverges from columnar to form a larger spot of light. This system requires an adjustable carriage for the lamp socket, and frequently requires provisions for minor (manual) adjustments along two additional axes orthogonal to the optical axis, so as to maintain proper alignment of the lamp on the optical axis, in addition to (motorized) adjustment along the optical axis for controlling beam divergence.

A convection-cooled automated luminaire described in U.S. Pat. No. 5,367,444 utilizes a 1000 watt incandescent lamp and an eight-inch, cold-mirror reflector coupled to a cast aluminum heat sink to project a light beam through four banks of pivoting light filters radially arranged about the optical axis of the luminaire. Three banks of filters are used to control the color of the beam, and the fourth bank of filters is used to control beam divergence. The lamp is dimmed electronically by a separate power supply. An eight-inch diameter glass lens covers the exit aperture. An assortment of different front lenses is available, the choice of which affects the amount and type of beam divergence which can be controlled. When this luminaire is converted to accept an arc lamp rather than an incandescent lamp, the fourth filter bank is converted to a dimmer, substituting opaque filter panels in place of textured glass panels, since an arc lamp cannot be electronically dimmed from full to zero without extinguishing the arc. This leaves an unfulfilled requirement for an apparatus to control beam divergence that fits in space available in the existing luminaire housing.

OBJECTS OF THE INVENTION

It is an object of the invention to provide a new and improved apparatus and method for controlling the divergence or convergence of a light beam.

It is a further object of the invention to provide a new and improved apparatus and method for controlling the divergence or convergence of a light beam which minimizes the luminaire cost, size and weight in comparison to previous systems for controlling the divergence or convergence of a light beam in a lighting instrument including an automated control of beam divergence or convergence.

It is also an object of the invention to provide a new and improved apparatus and method for controlling the divergence or convergence of a light beam, including an automated liquid cell lens which minimizes the mismatching of indices of refraction at the media boundaries within the liquid cell lens, thereby avoiding unwanted reflection, refraction and scattering.

A further object of the invention is to provide a new and improved apparatus and method for controlling the divergence or convergence of a light beam, including an automated liquid cell lens which projects a homogenous light beam.

A still further object of the invention is to provide a new and improved apparatus and method for controlling the divergence or convergence of a light beam, including an automated liquid cell lens which is useful in a stage lighting or architectural environment such that an operator can continuously adjust the coverage provided by the lighting instrument over a large range.

The foregoing specific objects and advantages of this invention are illustrative of those which can be achieved by the present invention and are not intended to be exhaustive or limiting of the possible advantages of this invention which can be realized. Thus, these and other objects and advantages of this invention will be apparent from the description herein or can be learned from practicing this invention, both as embodied herein or as modified in view of any variations which may be apparent to those skilled in the art. Accordingly, the present invention resides in the novel parts, constructions, arrangements, combinations and improvements herein shown and described.

SUMMARY OF THE INVENTION

The above-mentioned and other objects of the invention are met by a system which includes an automated liquid cell lens for controlling the divergence or convergence of a beam of light emanating from a luminaire. The system comprises three elements:

1. A liquid cell consisting of a rigid structure supporting flexible and transparent walls. The cell is filled with an optically clear fluid, such as silicone oil, that resists freezing and biological growth, and is also non-toxic and non-flammable. The flexible walls must be tight enough to remain flat and parallel under the static weight of the internal fluid. The walls must also deform when a pressure differential exists between the fluid pressure and the static air pressure.

2. A hydraulic cylinder serves as a fluid reservoir and pressure source, and is connected to the liquid cell by a tube.

3. A linear actuator is capable of moving the hydraulic cylinder piston in discrete steps to meter an exact amount of fluid to or from the cell with each step.

In a preferred embodiment, the rigid structure comprises an array of microcells providing fluid communication paths between and among the various microcells, each microcell supporting at least one flexible wall which operates as a variable-geometry lenslet. The individual microcells can be any convenient shape, but the geometry of each microcell affects the shape of the lenslet formed by the corresponding flexible wall thereby affecting the light distribution pattern of the whole array. The flexible walls may be of a constant thickness across each microcell, but the thickness of each flexible wall can be varied across each microcell to further affect the light distribution pattern of the whole array.

It will be appreciated by those skilled in the art that the foregoing brief description and the following detailed description are exemplary and explanatory of this invention, but are not intended to be restrictive thereof or limiting of the advantages which can be achieved by this invention. Thus, the accompanying drawings, referred to herein and constituting a part hereof, illustrate preferred embodiments of this invention and, together with the detailed description, serve to explain the principles of this invention.

BRIEF DESCRIPTION OF THE DRAWINGS

The present invention and its advantages may be clearly understood by referring to the following detailed description and the accompanying drawings of which:

FIG. 11 is a plan view of the liquid cell lens structure shown in FIG. 10;

FIG. 12 is a cross-sectional view taken along lines A—A of the liquid cell lens structure shown in FIG. 11;

FIG. 13 is a cross-sectional view taken along lines B—B of the liquid cell lens structure shown in FIG. 11;

FIG. 14 is across-sectional view taken along lines C—C of the liquid cell lens structure shown in FIG. 11;

FIG. 15 is a perspective view of the most preferred embodiment of the invention, a one-piece array of microcells with an integral flexible membrane mounted to a front glass;

FIG. 16 a cross-sectional view of the assembled one-piece array of microcells mounted to a front glass which is shown in FIG. 15;

FIG. 17 is a perspective detail view of the microcell array shown in FIG. 15;

FIG. 18 is a sectional detail view of the assembled one-piece array of microcells shown in FIG. 16;

DETAILED DESCRIPTION OF THE INVENTION

Figure 1:
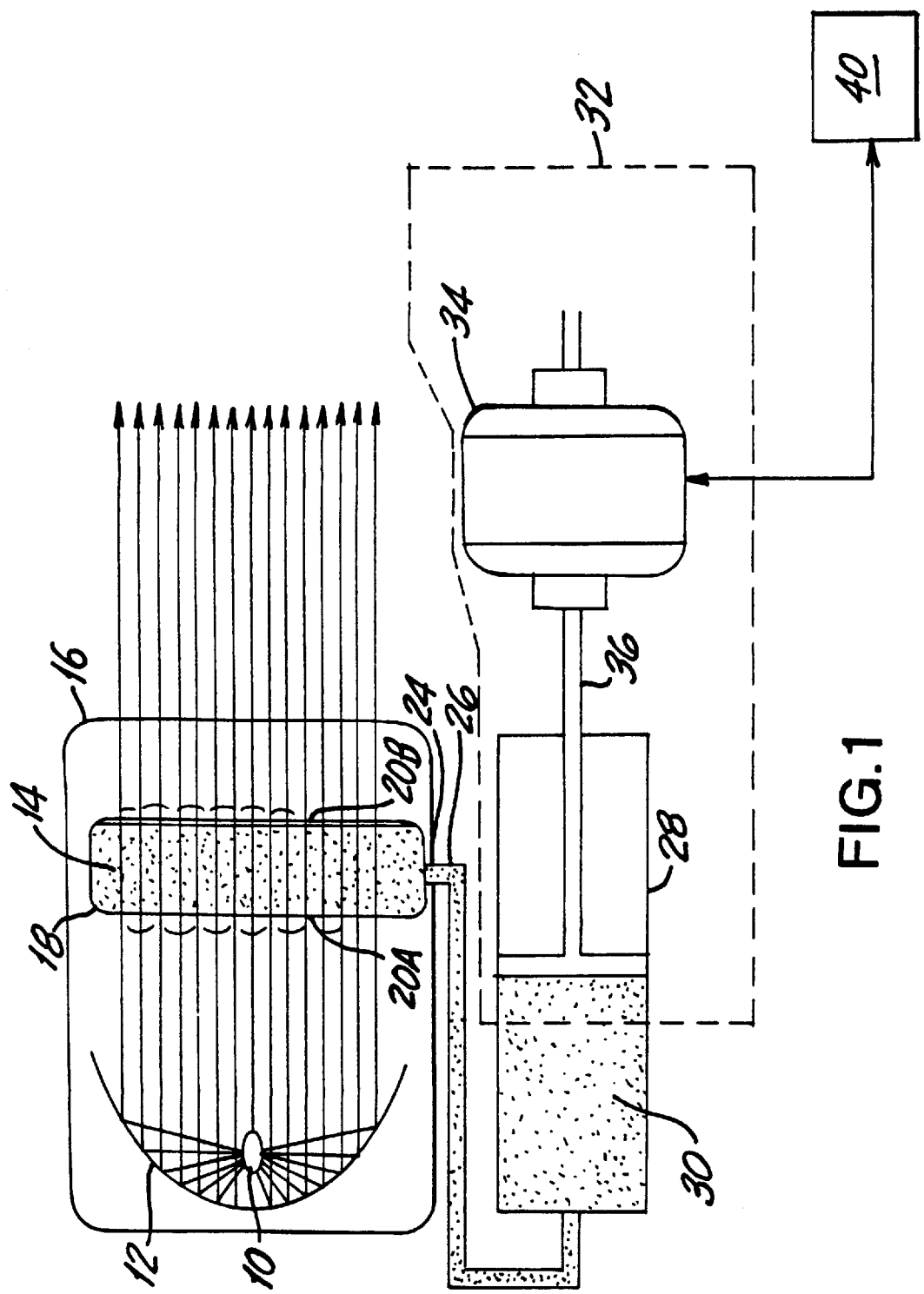
FIG. 1 is a block diagram of an optical system in accordance with the present invention wherein a liquid cell lens is in an optically powerless state.

FIG. 1 shows a block diagram of a lighting instrument incorporating an apparatus that includes a liquid cell lens in accordance with the present invention. Light source 10, reflector 12 and liquid cell lens 14 are shown encased within luminaire housing 16. A typical wash luminaire reflector 12 may be parabolic in shape. In FIG. 1, light source 10 and reflector 12 cooperate to produce a directed beam of light. Liquid cell lens 14 may be located at any convenient distance from the reflector within the luminaire housing.

A simple liquid cell lens has a rigid outer periphery 18, supporting two parallel, spaced membranes 20A and 20B essentially orthogonal to the beam axis. In a preferred embodiment, rigid outer periphery member 18 is annular in shape. Liquid cell membranes 20A and 20B must be deformable in response to pressure changes within the lens. They must also be optically transparent.

The size of the liquid cell lens should be commensurate in scope so as to encompass the diameter of the beam. The thickness of the liquid cell should be such that when the desired concave curvature of the opposing membranes 20A and 20B is attained, they do not touch.

Liquid cell lens 14 is connected in fluid communication via one or more ports 24 to interconnect piping 26 and optical liquid variable volume reservoir 28. Together, these elements form a closed system. Interconnect piping 26 and reservoir 28 may be conveniently located within or outside the luminaire housing 16, and located away from heat sources.

The optically clear liquid 30 should be of a composition that will not freeze at normally encountered temperatures, will not support biological growth and is non-toxic and non-flammable. A silicone fluid is preferred but some organic oils may also be acceptable. The composition of an acceptable optically clear liquid will depend upon the other components of the liquid cell system.

Finally, displacement pump 32 is provided in communication with reservoir 28. This pump must be of a type capable of pressurizing the fluid contained in the reservoir and lens system. FIG. 1 shows the pump assembly as a linear actuator 34 coupled to a hydraulic piston 36, and reservoir/hydraulic cylinder 28. Other types of displacement pumps could be chosen by one of skill in the art. The pump assembly, in FIG. 1 comprised of hydraulic cylinder 28, hydraulic piston 36 and linear actuator 34, may be located within or outside the luminaire housing 16 as convenient provided the reservoir may be sufficiently pressurized and depressurized to deform the flexible walls of the liquid cell lens 14.

FIG. 1 shows the lighting instrument in a neutral state in which the liquid cell lens has no significant effect on the light beam since its transparent membranes 20A and 20B are essentially parallel to one another and orthogonal to the beam. In this condition, the lens has no effect on the beam of light.

Figure 2:
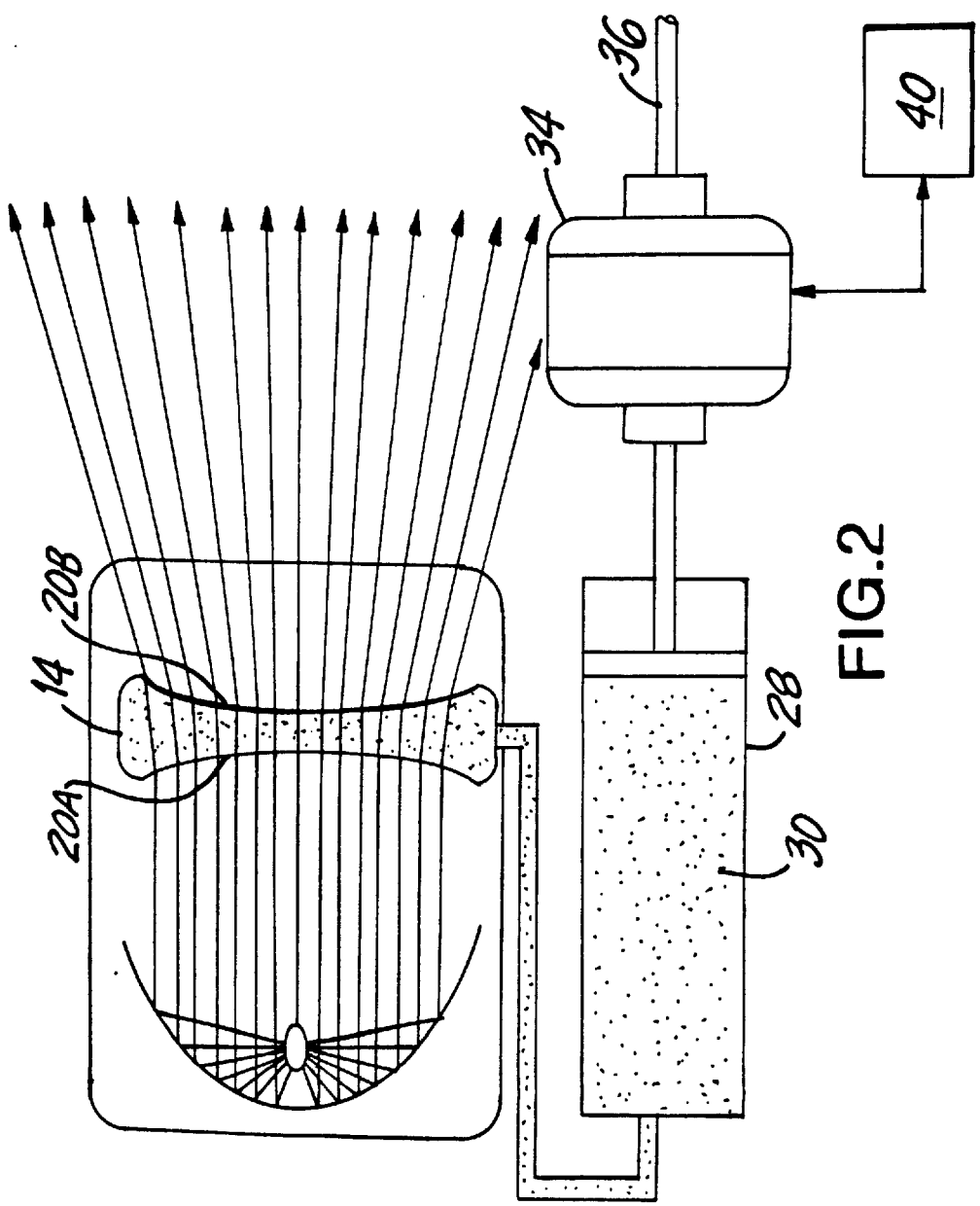
FIG. 2 is a block diagram of an optical system in accordance with the present invention wherein a liquid cell lens has negative power and is diverging light.

Operation of the pump 32 to withdraw optically clear liquid 30 from the liquid cell lens 14 results in coordinated concave deformation (or bowing) of the opposing transparent flexible membranes 20A and 20B by the ambient air pressure to form a bi-concave lens of varying negative power depending upon how much optical liquid is removed from the liquid cell lens. The effect of this operation is shown in FIG. 2, wherein the liquid cell lens serves to diverge the light beam and enlarge the area covered by the beam. One of skill in the art will be able to operate a liquid cell lens of the type disclosed to produce a wide continuum of differing beam divergence angles.

Shaping the opposing flexible transparent membranes 20A and 20B into increasingly concave surfaces to achieve a wider beam divergence requires transporting substantial amounts of optically clear fluid from the liquid cell to the reservoir. For example, in an annular cell approximately eight inches in diameter, approximately 8.5 cubic inches of liquid would need to be withdrawn in order to convert the liquid cell lens from a dual parallel surface purely zero power to a biconcave negative-power optical element having a radius of approximately twelve inches.

In FIG. 2, the increased fluid 30 in the reservoir 28 is depicted, as is the lateral movement of the hydraulic piston 36 through the driving actuator 34. The actuator 34 is depicted as under direct control of a system controller 40. It will be appreciated that a linear actuator such as that made by Haydon Switch Inc. is especially suited to the present invention because of size, force generated and cost.

Figure 3:
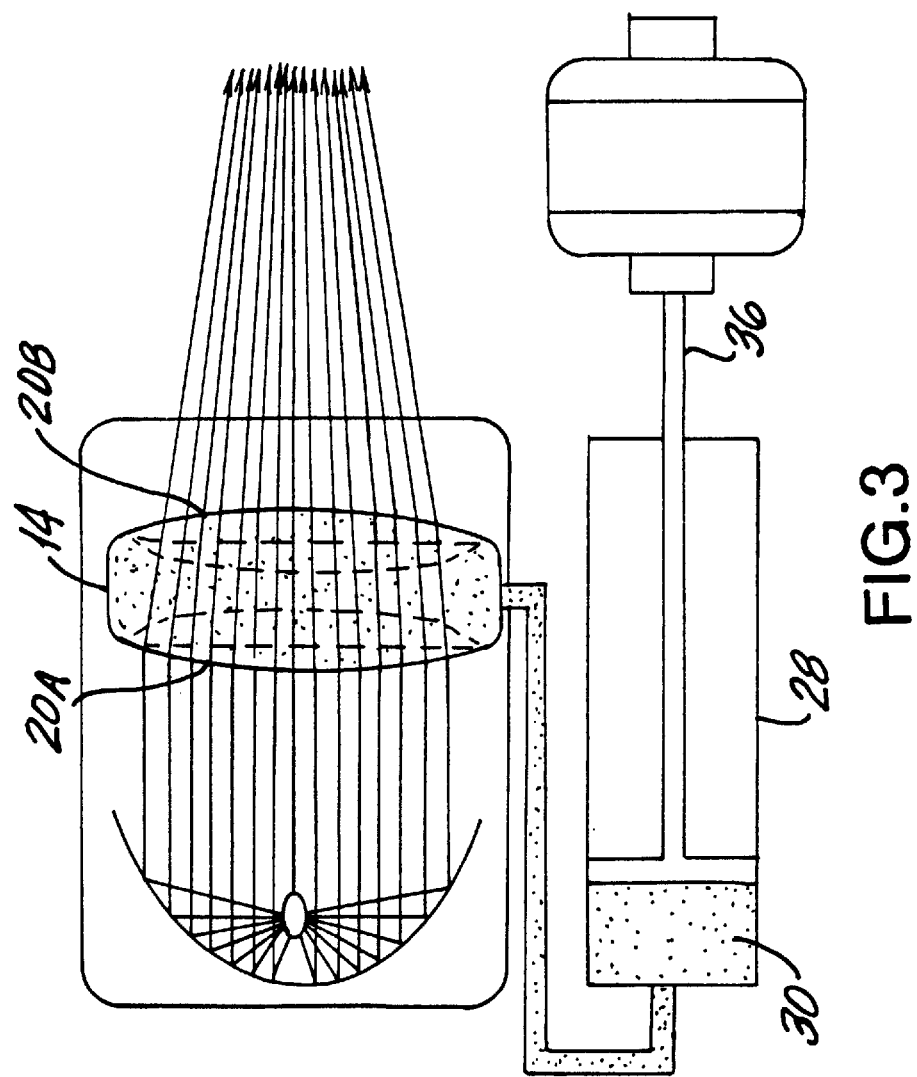
FIG. 3 is a block diagram of an optical system in accordance with the present invention wherein a liquid cell lens has positive power and is converging light.

FIG. 3 depicts the opposite condition, in which optically clear fluid 30 has been pumped by the lateral movement of the hydraulic piston 36 from reservoir 28 to the liquid cell lens 14. When fluid is injected into the cell and the internal liquid cell pressure is greater than the static air pressure, the opposing deformable transparent membranes 20A and 20B bulge or bow outward forming a bi-convex lens as shown in FIG. 3. When the liquid cell is in this condition, it acts as a positive-power optical element converging the light beam, which is concentrated to a smaller area thereby increasing its intensity. As with the divergent application of the liquid cell, the ability to reduce beam coverage is proportional to the curvature of the liquid cell's transparent membranes 20A and 20B. In operation, a wash light of the type disclosed is very useful in lighting a stage because an operator is able to continuously adjust the coverage provided by a general purpose washlight over a wide range of areas.

Figure 4:
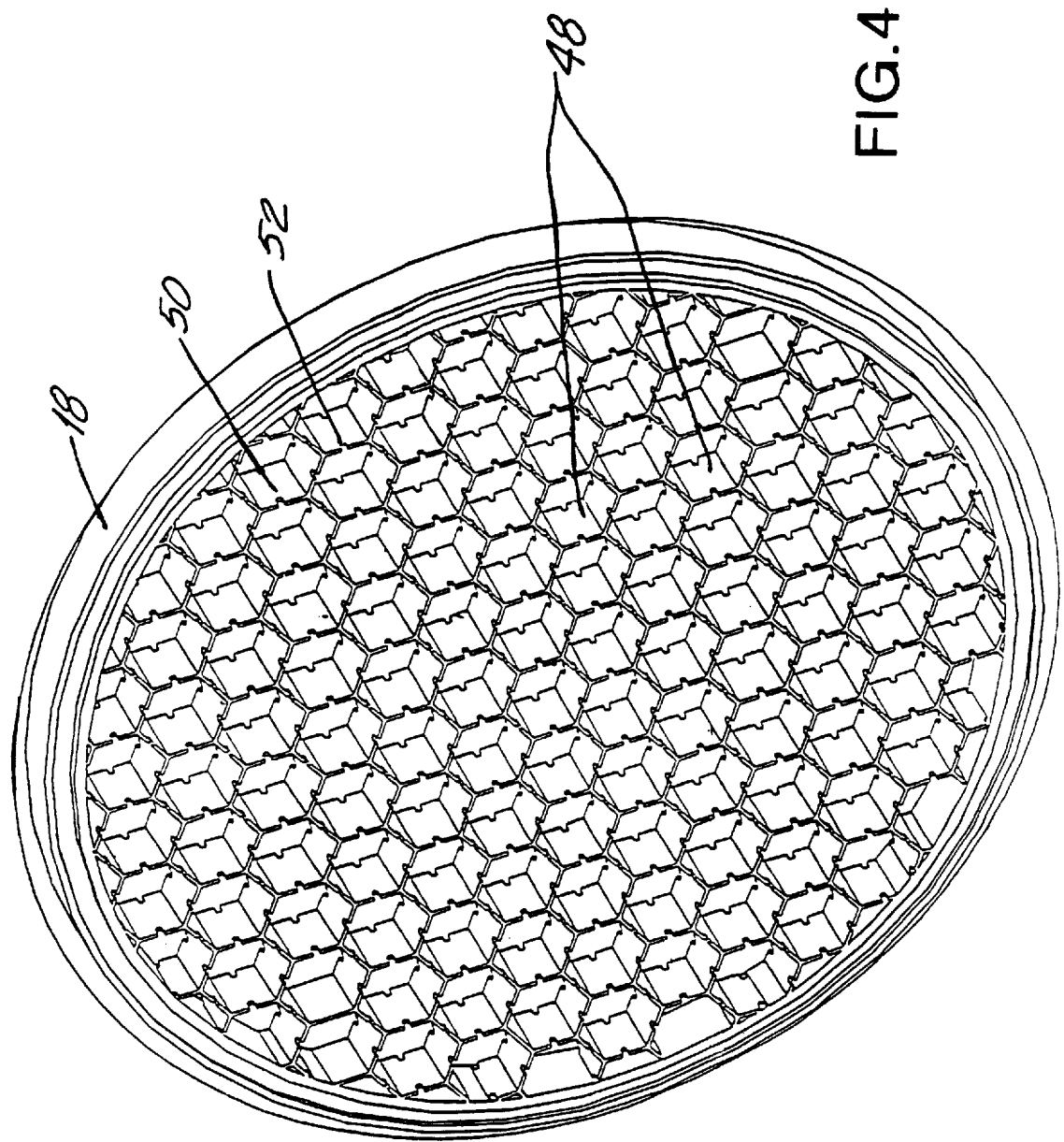
FIG. 4 is a perspective view of a preferred embodiment of the liquid cell lens in accordance with the present invention wherein hexagonal microcells are arrayed in a honeycomb formation.

In accordance with another embodiment of the present invention, and as shown in FIG. 4, a preferred liquid cell lens includes an array of microcells supporting opposing selectively deformable transparent membranes 20A and 20B (not shown). These microcells 48 are formed from any convenient shape and pattern of microcell walls 50 and the two opposing transparent membranes 20A and 20B. Although any number and shape of microcells may be selected for a given application, the specific cell geometry having a particular effect upon the shape of a light beam, a hexagonal honeycomb as shown in FIG. 4 is found to provide an acceptable mix of strength, weight, and cell coverage. Microcell walls should be more inflexible than the deformable transparent membranes 20A and 20B but need not be as rigid as the rigid outer periphery member 18. Microcell walls should also be as transparent as possible thereby avoiding light blockage. A particularly preferred material for the microcell walls as shown in FIG. 4 is plastic.

Channels in the microcell walls allow for flow of optically clear liquid between the microcells thereby equalizing pressure. As shown in FIG. 4, channels 52 provide for the flow of optically clear liquid between the microcells and ultimately in and out of the liquid cell lens array through port(s) 24 (not shown in FIG. 4). Acceptable variations of channels 52 which permit the flow of liquid between the microcells would be immediately apparent to one of skill in the art.

Figure 5:
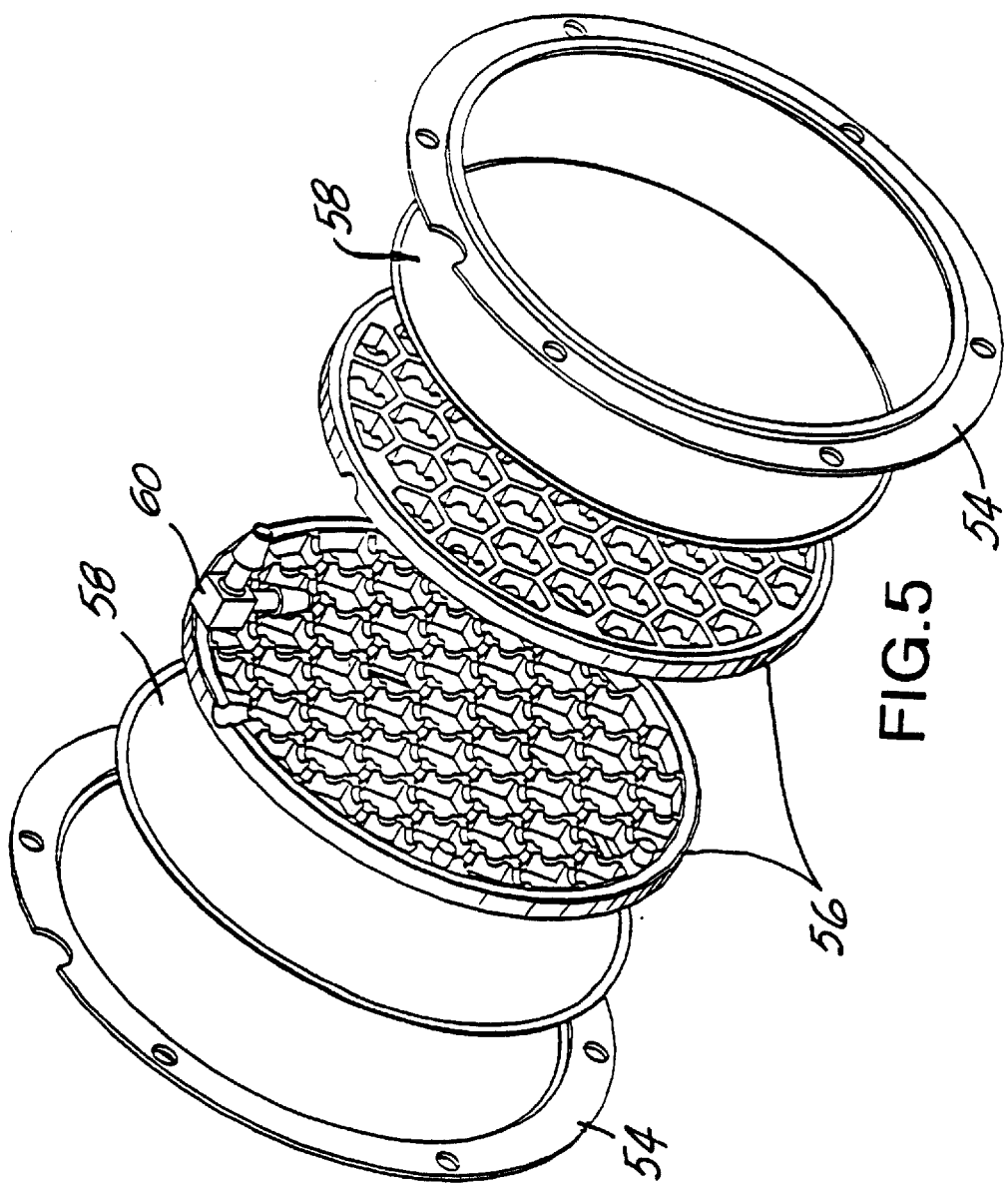
FIG. 5 is a perspective view of a liquid cell lens in accordance with the present invention wherein hexagonal microcells are arrayed in a two-piece structure supporting separate flexible membranes.

The invention also contemplates another embodiment of the liquid cell lens in which an array of microcells is formed by two pieces, each piece including half of the rigid cell supporting membranes. As shown in FIG. 5, molded hexagonal honeycomb pieces 56 form the structural walls of the microcell array. A flexible film membrane 58 is glued to each honeycomb structure 56. Elbow fitting 60 is captured between the two honeycomb structural pieces. The whole microcell array lens is held together by lens clamps 54 secured with suitable fasteners (not shown). Structural pieces 56 are rigid, transparent molded plastic. The flexible film 58 may be a transparent silicone rubber. The elbow fitting 60 connects the piping 26 to the liquid cell lens for transportation of the optically clear liquid 30 to the lens.

Figures 6, 7, 8:
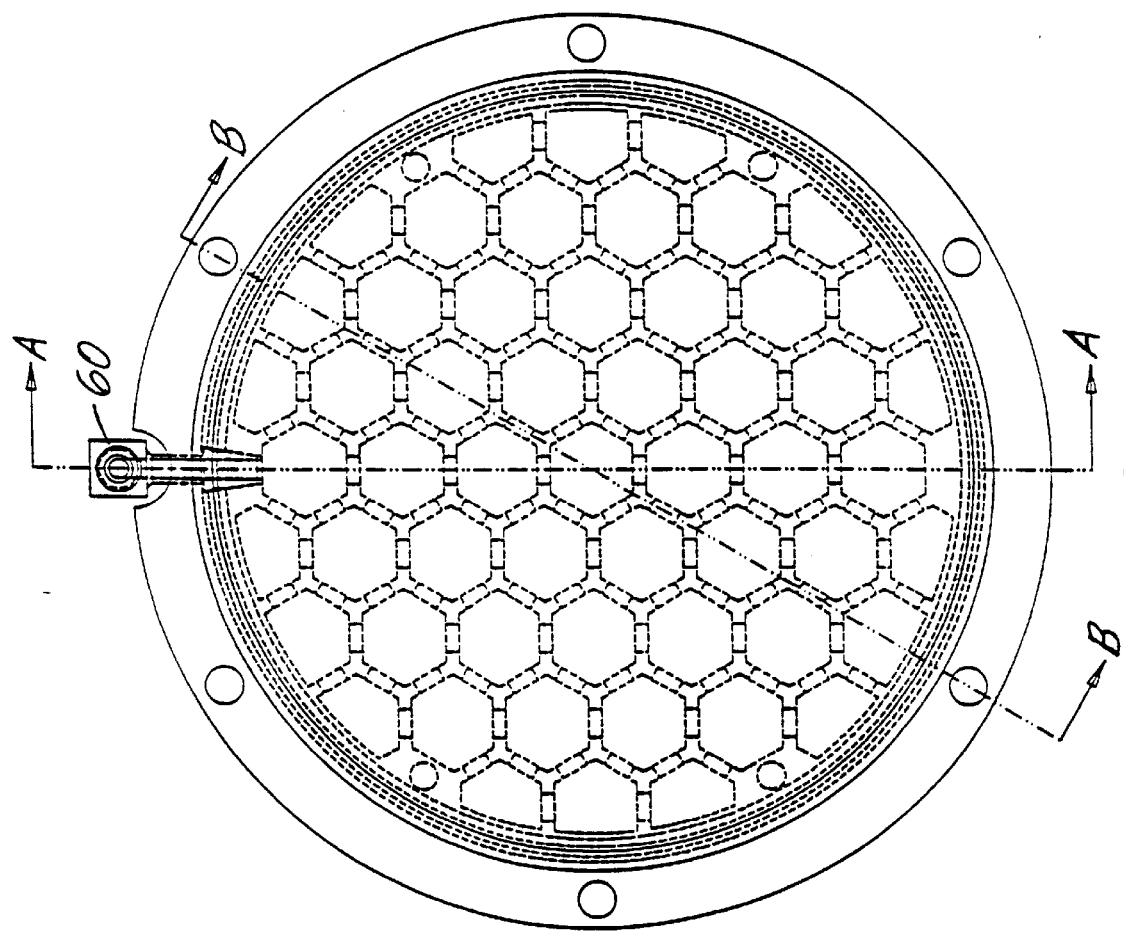
FIG. 6 is a plan view of the liquid cell lens structure shown in FIG. 5.
FIG. 7 is a cross sectional view taken along lines A—A of the liquid cell lens structure shown in FIG. 6.
FIG. 8 is a cross-sectional view taken along lines B—B of the liquid cell lens structure shown in FIG. 6.

FIG. 6 shows a plan view of the liquid cell lens structure of FIG. 5 with sections A—A and B—B. FIG. 7 is a cross-sectional view taken along lines A—A of the structure shown in FIG. 6 and FIG. 8 is a cross-sectional view taken along lines B—B of the structure shown in FIG. 6. As shown in FIGS. 7 and 8, channels 52 form liquid passages between and among the microcells of molded hexagonal honeycomb 56.

Figure 9:
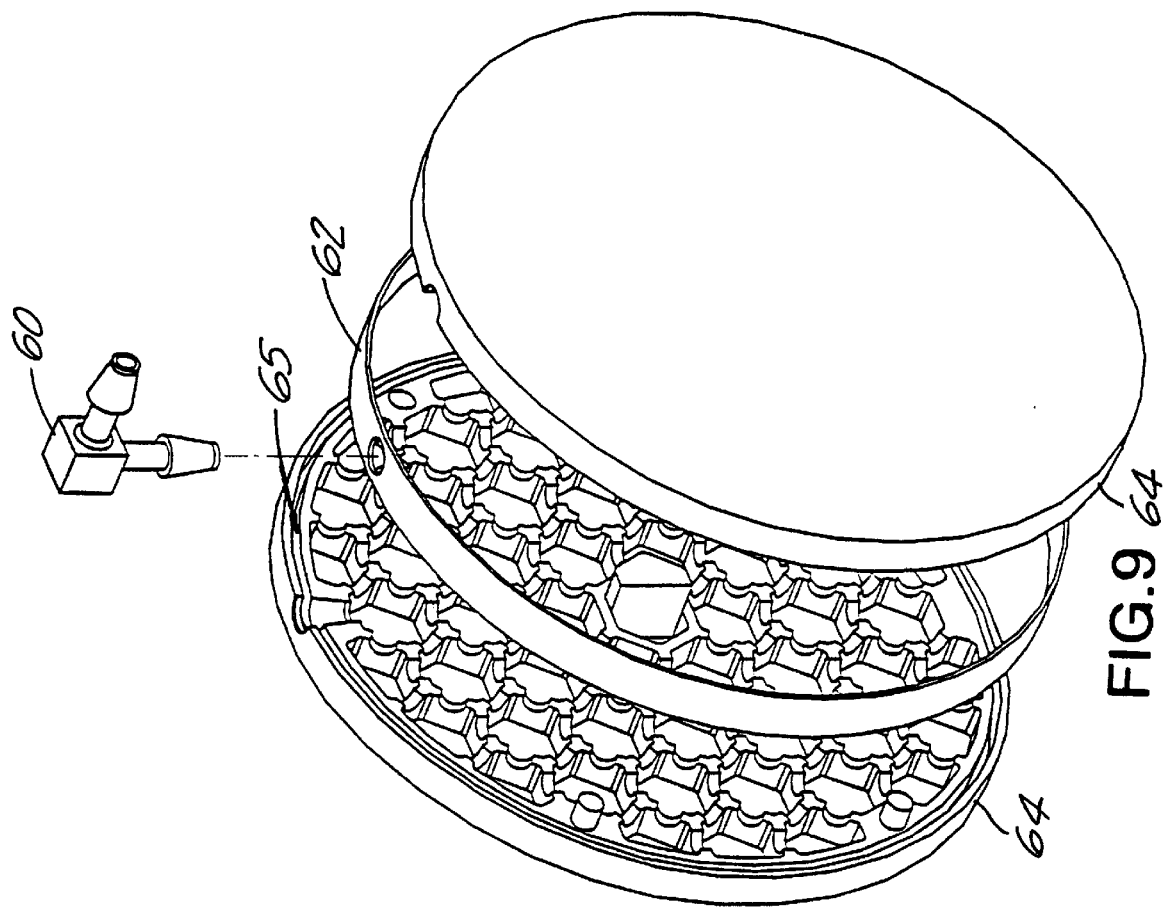
FIG. 9 is a perspective view of a liquid cell lens in accordance with the present invention wherein hexagonal microcells are arrayed in a two-piece structure with integral flexible membranes as features of molded, hermaphroditic halves.
Figure 10:
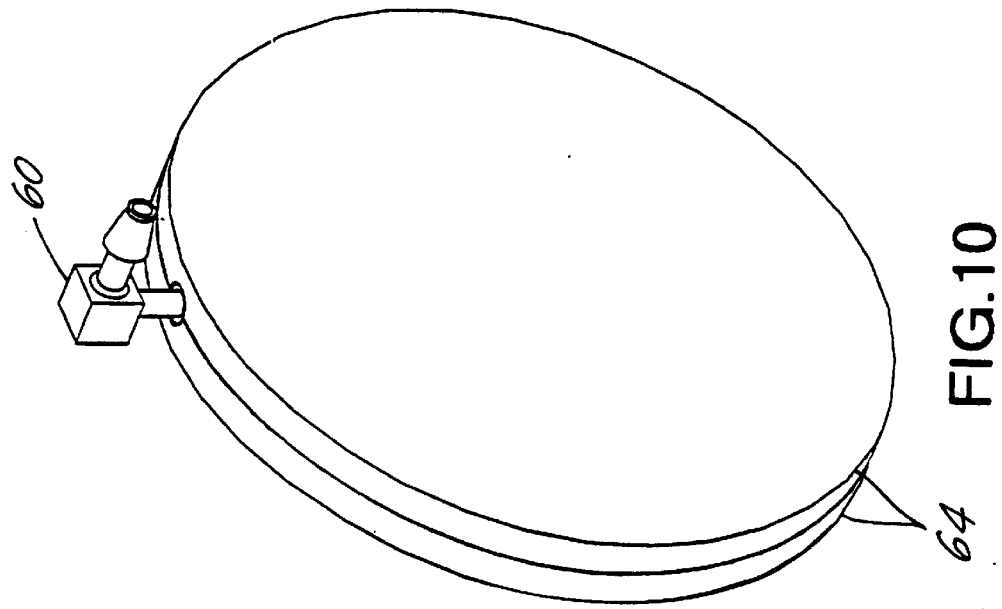
FIG. 10 is a perspective view of an assembled liquid cell lens structure shown in FIG. 9.

FIG. 9 shows an alternate embodiment of a two-piece microcell array in which each molded piece 64 includes the rigid structural walls of the microcell array with an integral membrane forming the flexible walls. The structural walls are molded to be thicker than the flexible walls, to provide rigidity for the structural walls. Peripheral channels 65 formed in each piece 64 accept annular structural member 62 when the microcell array lens is assembled, thereby associating the elbow fitting 60 in combination with the microcell structural pieces 64. Annular structural member 62 provides peripheral rigidity in addition to locating the elbow fitting. FIG. 10 illustrates the assembled embodiment of FIG. 9.

FIG. 11 shows a plan view of the liquid cell lens structure of FIG. 9 with sections A—A, B—B and C—C. FIG. 12 is a cross-sectional view taken along lines A—A of the structure shown in FIG. 9. FIG. 13 is a crosssectional view taken along lines B—B of the structure shown in FIG. 9. FIG. 14 is a cross-sectional view taken along lines C—C of the structure shown in FIG. 9. As is shown in FIGS. 12, 13 and 14, channels 52 form liquid passages between and among the microcells of the liquid cell lens structure of FIG. 9.

In a most preferred embodiment shown in FIG. 15, the liquid cell lens assembly consists of two parts: a flexible membrane 70 with features molded into one surface that form a hexagonal support structure 72 for refracting lenslets 74 (see FIG. 17); and a mounting surface 80 made of glass or other clear, rigid material. Membrane 70 and mounting surface 80 are bonded together forming a sealed assembly that can be filled with a liquid and pressurized through inlet hole 76.

FIG. 16 is a cross-sectional view taken along lines A—A of the structure shown in FIG. 15. The membrane 70 shown in FIG. 16 is formed into a generally convex shape that conforms to the concave inner surface of the preferred glass mounting surface 80. The outer periphery of the membrane 71 has sufficient thickness to support the diaphragm during the mounting process.

As shown in FIG. 17, membrane support posts 73 extend from the support structure between the lenslets 74. The posts make contact with the inner surface of the glass mounting surface 80 when the flexible membrane 70 and the mounting surface 80 are mated together.

The lens assembly is adhesively bonded with an optically clear cement that has an index of refraction closely matching the lens membrane material and the liquid filler. The adhesive is spread over the concave surface of the mounting surface 80 and around the edge of the glass. A complete seal is formed between the edge 71 of flexible membrane 70 and a periphery of the mounting surface 80 except for the area of the inlet hole. The membrane support posts 73 are bonded to the inner surface of the glass. When the assembly is filled with index-matched fluid, the bonding cement and hexagonal support structure disappear in the liquid and have no effect on light passing through the system.

In practice, positive fluid pressure forms positive or convex lenslets that have enough power to diverge the beam over an acceptable angle. FIG. 18 shows how the fluid pressure distends the cell surfaces 78 and forms a near spherical lenslet with optical power to diverge the light beam passing through the lens. The curved glass mount 80 also serves to further diverge the light beam since the lenslets are spherically arrayed over a small solid angle centered on the optical axis 90 (shown in FIG. 16) of the light beam. If the lenslets are not distended by fluid pressure, the spherical shape of the mount has little effect on the light beam.

One of the chief advantages to using microcells in the liquid cell lens is that each microcell is a small concave or convex element of the same optical power of the larger single cell yet having the displacement of a smaller volume of optical liquid. Thus, the large volumes needed to be moved in a single cell system can be decreased dramatically. Another advantage is that a larger number of microcells provides even greater integration or smoothing of the light across the beam. There is, however, a practical limit. As the number of cells increases, there is an increase in undeformed area where cell walls support the membrane.

An array of hexagonal microcells yields an array of near spherical lenslets as the flexible wall of each microcell distends into a dome of near spherical profile under pressure. An array of rectangular microcells, such as shown in FIG. 19, yields an array of cylindrical lenslets that refract light symmetrically to either side of its long axis if the flexible membrane covering the microcells has a constant thickness across each cell.

Figure 19:
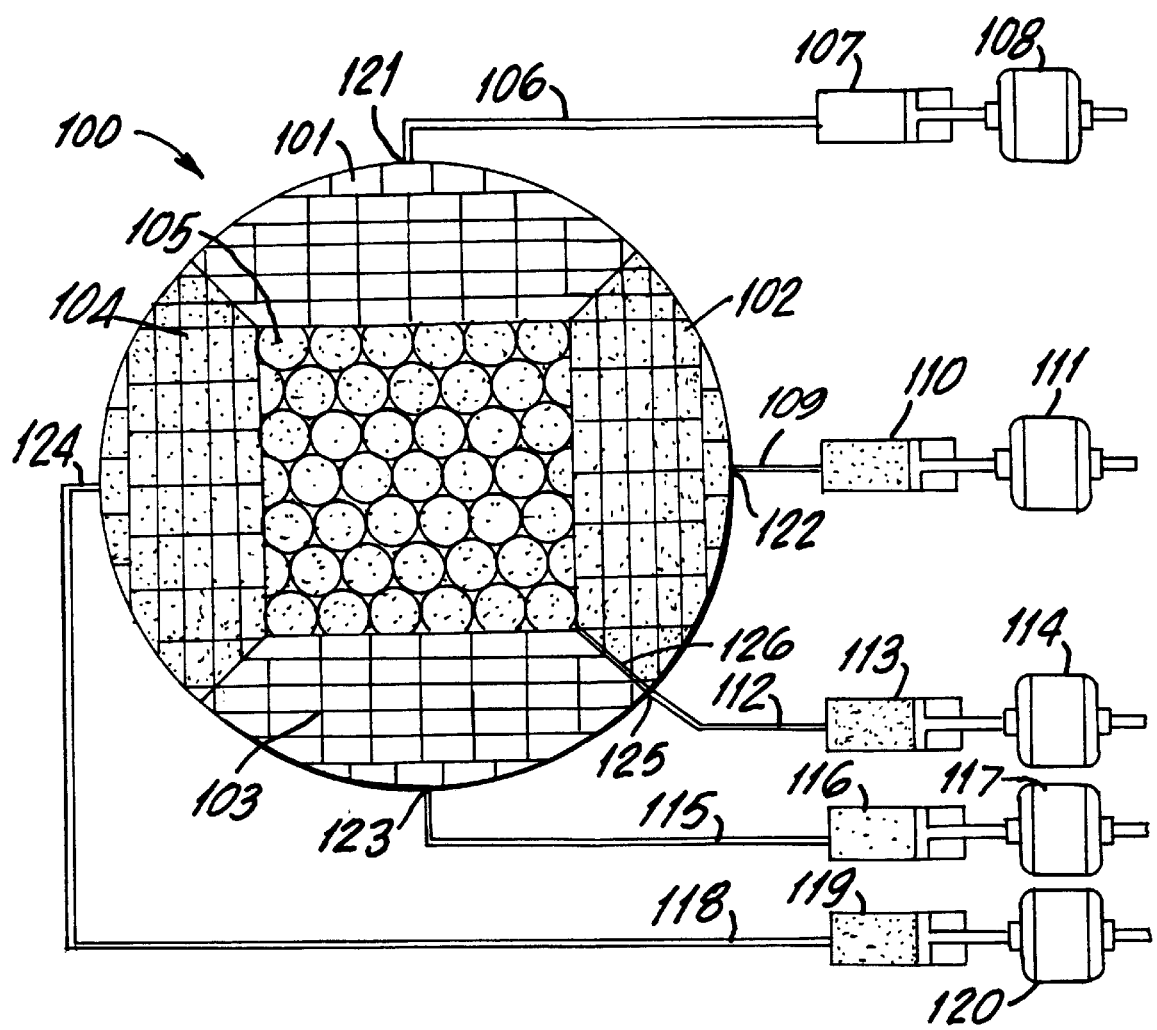
FIG. 19 is a plan view of a multi-cellular array according to a further aspect of the invention, showing plural regions of the cellular array and separate actuators for each region.
Figure 22:
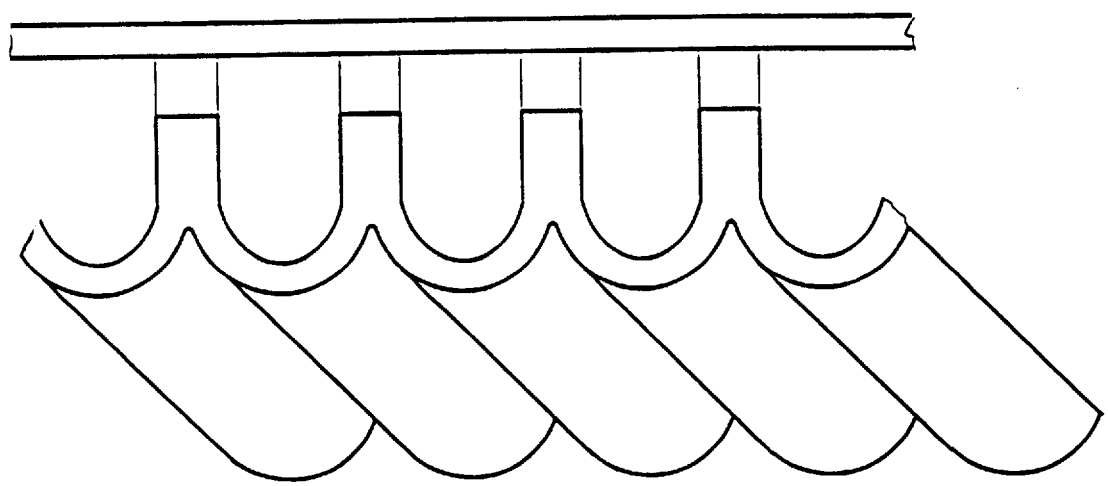
FIG. 22 is a perspective view of the microcells shown in FIG. 21 in a positive power state.
Figure 23:
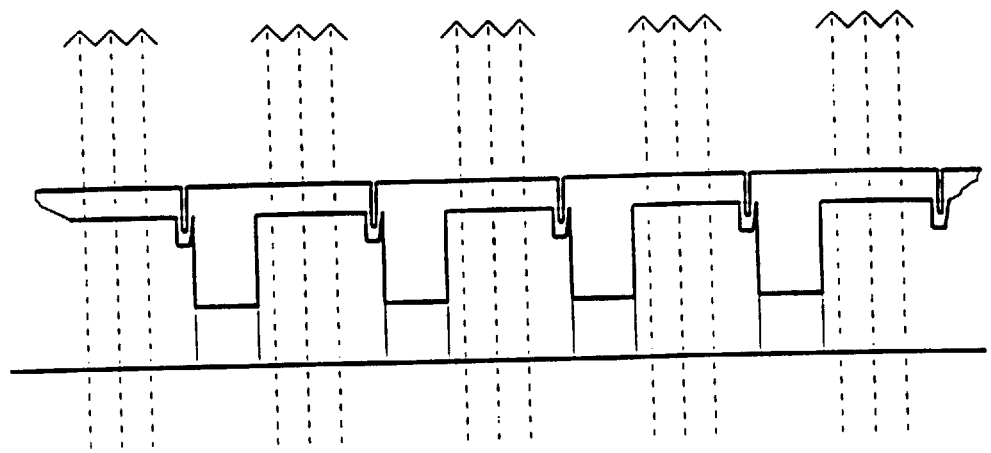
FIG. 23 is a sectional view of microcells, in a powerless state, according to another aspect of the invention.

Referring to FIG. 19, a complex liquid cell lens apparatus 100 has a single flexible membrane mounted to a glass plate, similar to that shown in FIG. 15, except that the flexible membrane is formed having plural, separately controllable regions 101 through 105. A central region 105 has a hexagonal array of spherical microcells (hexagonal microcells might also be used) which form spherical lenslets when distended under positive pressure. Peripheral regions 101 through 104 have arrays of rectangular microcells which form cylindrical lenslets, as shown in FIG. 22, when distended under pressure. The microcells of each region include channels interconnecting the various microcells in manner described hereinbefore, to allow for liquid flow between and among the microcells of each region, but the various regions are isolated from each other to prevent liquid flow between regions. Any number, pattern or shape of different regions, including the specific geometry of the individual microcells contained in a region, may be selected for a given application.

Region 101 includes a liquid inlet port 121 to which is connected a pipe 106 for carrying optically clear liquid between the liquid cell lens and reservoir/hydraulic cylinder 107. The clear liquid flows into and/or out of port 121 to control the action of the microcells and lenslets of region 101. Actuator 108 is coupled to cylinder 107 to effect liquid flow as described hereinbefore. Similarly, region 102 includes inlet port 122 to which is connected pipe 109 communicating clear liquid from cylinder 110 coupled to actuator 111. Region 103 includes inlet port 123 to which is connected pipe 115 communicating clear liquid from cylinder 116 coupled to actuator 117. Region 104 includes inlet port 124 to which is connected pipe 118 communicating clear liquid from cylinder 119 coupled to actuator 120. Regions 101 through 104 are separately controllable.

Central region 105 includes a liquid communication channel 126 which terminates in port 125. Channel 126 conducts liquid from port 125 to the microcell array of region 105, and the channel lies between and is separate from the microcell arrays of regions 102 and 103. Pipe 112 is connected to port 125 and communicates clear liquid from cylinder 113 coupled to actuator 114. The microcells of region 105 are controllable separately from any of the regions 101 through 104.

In operation, a liquid cell lens 100 controls beam divergence of a central portion of a light beam by the action of microcell array region 105, and controls beam divergence of peripheral portions of the light beam by the action of microcell array regions 101 through 104. Region 105 imparts a conical beam divergence pattern when pressurized, owing to the spherical lenslets formed by the microcells thereof. Regions 101 and 103 impart beam divergence patterns along one axis (vertically, for example) orthogonal to a beam axis such as axis 90 as shown in FIG. 16, while regions 102 and 104 impart beam divergence patterns along another axis (horizontally, for example) orthogonal to the beam axis. Region 105 can then be used to spread the light from the central portion of the beam while leaving the periphery of the beam unchanged. Regions 101 and 103 can be used to increase beam divergence vertically while regions 102 and 104 can be used to increase beam divergence horizontally. Regions 101 and 103 can be operated from a single hydraulic cylinder and actuator while regions 102 and 104 can also be operated from a single hydraulic cylinder and actuator in a system of reduced complexity. The system as shown in FIG. 19 provides for independent divergence control of central, top, bottom, left, and right portions of a light beam projected therethrough for more precise beam shaping.

Figure 20:
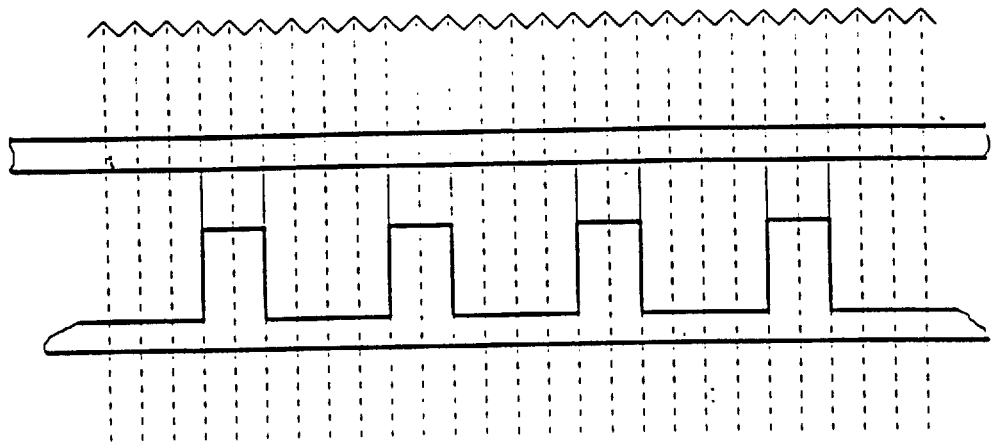
FIG. 20 is a sectional view of microcells, in a powerless state, of a region shown in FIG. 19.
Figure 21:
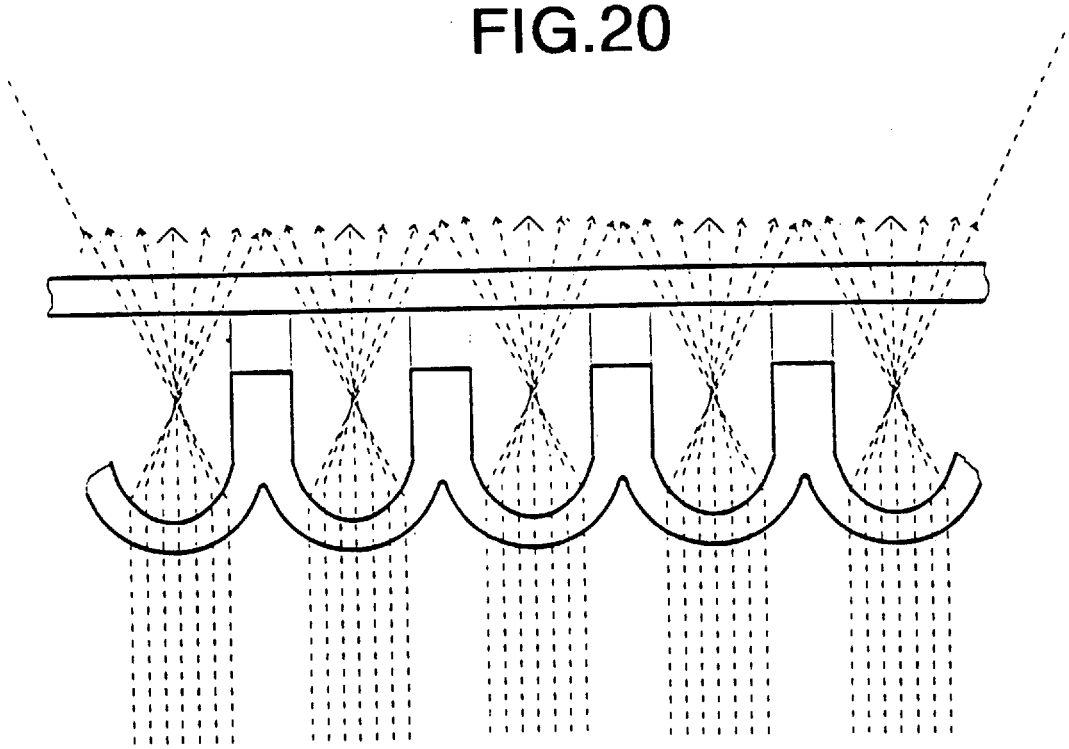
FIG. 21 is a sectional view of microcells, in a positive power state, of a region shown in FIG. 19.

Each of the rectangular microcells of regions 101 through 104 shown in FIG. 19 forms a cylindrical lenslet as shown in FIG. 22 when pressurized. FIGS. 20 and 21 illustrate the action of the flexible diaphragm at rest (FIG. 20) and distended under pressure (FIG. 21). At rest, the light rays passing through the various microcells are undisturbed by the flat surface of the various microcells. When the surfaces of the microcells are distended under pressure, the light rays converge at a point in front of the distended surfaces and diverge thereafter to form a divergent light beam. This is similar to the action of the microcell array shown in FIGS. 15 through 18, except that the lenslets formed by the distended surfaces of the rectangular microcells of regions 101 through 104 of FIG. 19 are cylindrical lenses as shown in FIG. 22.

Figure 24:
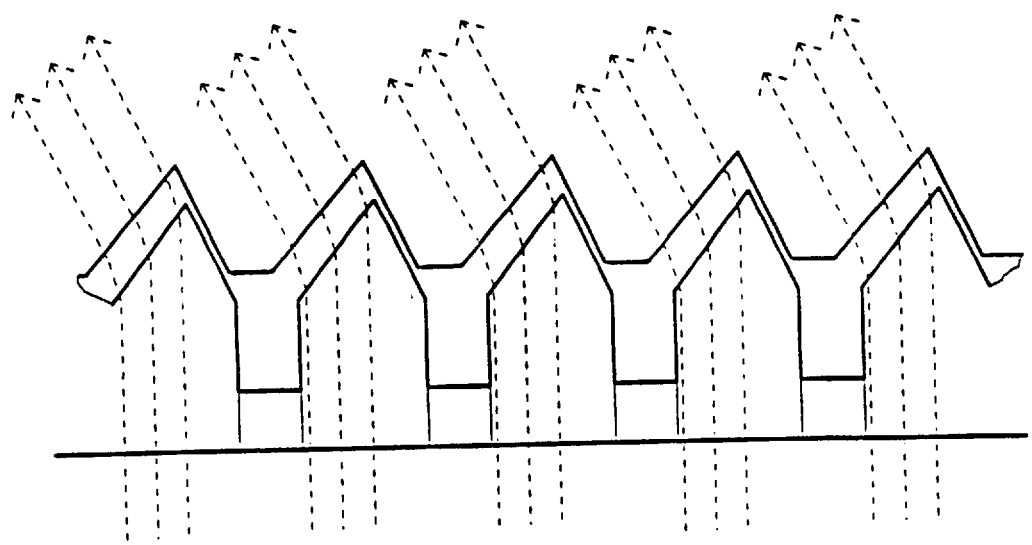
FIG. 24 is a sectional view of microcells, in a wedge state, according to another aspect of the invention.

A variable-thickness membrane covering the same rectangular cell forms a wedge-shaped lens that throws light to one side, as shown in FIG. 24. By controlling the thickness of the deformable surface of the membrane across each microcell and the geometry of the microcell support walls through careful design, a variety of lenslet shapes can be made to yield a variety of beam divergence patterns. Many desired light patterns can be created with lenses incorporating these techniques. In operation, the effect of such a lens is to go from no effect on the beam while at rest to custom-designed distribution pattern of variable extent.

An important feature of this embodiment of the applicant's invention is the use of an optically clear liquid whose index of refraction has been matched to that of the transparent microcell walls to minimize refraction and reflection at the liquid/cell wall boundaries. In a preferred embodiment, microcell walls composed of silicone rubber have an index of refraction of approximately 1.43 while an optically clear liquid such as Dow Corning FS-1265 has an index of refraction of approximately 1.38. The cell walls disappear when the index of refraction of the clear liquid perfectly matches the index of refraction of the microcell walls. One of skill in the art will be able to adjust the composition of the optically clear liquid, the size and shape of the microcells, the material of the microcell walls and the flow rates of the closed liquid system in order to maximize the desired divergence or convergence effects on the luminaire light beam.

As is described above, the disclosed liquid cell lens would be very useful in a stage lighting environment where an operator could continuously adjust the coverage provided by a general purpose washlight. The device lends itself well to automation where a local processor could change the lens power by operating the linear actuator as needed to respond to the operator's commands. The disclosed embodiments provide a highly variable, high temperature, easily controllable apparatus for controlling beam divergence which is also adapted for use in modern automated luminaires because of its relatively low weight, small size and low cost.

The present invention also contemplates applications other than stage lighting. For example, a lighting apparatus such as an architectural luminaire, intended to compliment a building or other display, can be constructed using the foregoing techniques. Although illustrative embodiments have been described herein in detail, it should be noted and will be appreciated by those skilled in the art that numerous variations may be made within the scope of this invention without departing from the principles of this invention and without sacrificing its chief advantages. The terms and expressions have been used as terms of description and not terms of limitation. There is no intention to use the terms or expressions to exclude any equivalents of features shown and described or portions thereof and this invention should be defined in accordance with the claims which follow.

I claim:

1. An apparatus for controlling the distribution of a light beam, comprising:

a liquid cell lens containing an optically transparent liquid and having at least one flexible optically transparent membrane, said membrane containing an array of microcells, each of said microcells being in fluid communication with each other, and at least one rigid member supporting said flexible optically transparent membrane; and means for communicating said optically transparent liquid to said liquid cell lens.

2. The apparatus of claim 1, further comprising hexagonally shaped microcells arrayed in a honeycomb pattern.

3. The apparatus of claim 1, wherein said microcells are simple geometric shapes arrayed in a contiguous arrangement.

4. The apparatus of claim 1, wherein the wall thickness of said microcells varies across a surface thereof to further control the distribution of light in said light beam.

5. The apparatus of claim 1, wherein said flexible optically transparent membrane contains separate regions of said microcells whereby each region controls the distribution of light in a separate portion of said beam.

6. The apparatus of claim 5, wherein the geometric shape of said microcells varies from region to region.

7. The apparatus of claim 5, wherein the geometric shape of each region varies.

8. The apparatus of claim 5, wherein each region has a separate means for communicating said optically transparent liquid to said region.

9. The apparatus of claim 2, wherein said flexible optically transparent membrane and said optically transparent liquid have substantially the same index of refraction whereby said beam passing through said liquid cell lens is not substantially refracted at an optical liquid and flexible membrane boundary.

10. The apparatus of claim 2, wherein said rigid member is a solid optically transparent mounting member for said flexible optically transparent membrane.

11. The apparatus of claim 2, wherein said rigid member supports the outer periphery of said flexible optically transparent membrane.

12. An apparatus for controlling the distribution of a light beam. comprising:
 a liquid cell lens containing an optically transparent membrane. said membrane containing an array of microcells, each of said microcells being in fluid communication with each other, and at least one rigid member supporting said flexible optically transparent membrane:
 a variable volume optical liquid reservoir separate from said liquid cell lens but in fluid communication with said liquid cell lens; and
 a displacement pump in fluid communication with said reservoir.

13. The apparatus of claim 12, further comprising hexagonally shaped microcells arrayed in a honeycomb pattern.

14. The apparatus of claim 12, wherein said microcells are simple geometric shapes arrayed in a contiguous arrangement.

15. The apparatus of claim 12, wherein the wall thickness of said microcells varies across a surface thereof to further control the distribution of light in said light beam.

16. The apparatus of claim 12, wherein said flexible optically transparent membrane contains separate regions of said microcells whereby each region controls the distribution of light in a separate portion of said beam.

17. The apparatus of claim 16, wherein the geometric shape of said microcells varies from region to region.

18. The apparatus of claim 16, wherein the geometric shape of each region varies.

19. The apparatus of claim 16, wherein each region has a separate means for communicating said optically transparent liquid to said region.

20. The apparatus of claim 12, wherein said flexible optically transparent membrane and said optically transparent liquid have substantially the same index of refraction whereby said beam passing through said liquid cell lens is not substantially refracted at an optical liquid and flexible membrane boundary.

21. The apparatus of claim 12, wherein said rigid member is a solid optically transparent mounting member for said flexible optically transparent membrane.

22. The apparatus of claim 12, wherein said rigid member supports the outer periphery of said flexible optically transparent membrane.

23. The apparatus of claim 12 wherein said pump further comprises:
 a hydraulic cylinder and piston for pressurizing and depressurizing said reservoir and a linear actuator driveably connected to said piston capable of metering an exact amount of fluid to or from said liquid cell lens by actuating said piston.

24. An apparatus for controlling the distribution of a light beam. comprising:
 a light source positioned within a housing;
 a reflector positioned within said housing, said reflector producing a directed beam of light from said light source:
 a liquid cell lens containing an optically transparent fluid and having at least one flexible optically transparent membrane, said membrane containing an array of microcells, each of said microcells being in fluid communication with each other, and at least one rigid member supporting said flexible optically transparent membrane;
 a variable volume optical liquid reservoir separate from said liquid cell lens but in fluid communication with said liquid cell lens; and
 a displacement pump in fluid communication with said reservoir.

25. The apparatus of claim 24, further comprising hexagonally shaped microcells arrayed in a honeycomb pattern.

26. The apparatus of claim 24, wherein said microcells are simple geometric shapes arrayed in a contiguous arrangement.

27. The apparatus of claim 24, wherein the wall thickness of said microcells varies across a surface thereof to further control the distribution of light in said light beam.

28. The apparatus of claim 24, wherein said flexible optically transparent membrane contains separate regions of said microcells whereby each region controls the distribution of light in a separate portion of said beam.

29. The apparatus of claim 28, wherein the geometric shape of said microcells varies from region to region.

30. The apparatus of claim 28, wherein the geometric shape of each region varies.

31. The apparatus of claim 28, wherein each region has a separate means for communicating said optically transparent liquid to said region.

32. The apparatus of claim 24, wherein said flexible optically transparent membrane and said optically transparent liquid have substantially the same index of refraction whereby said beam passing through said liquid cell lens is not substantially refracted at an optical liquid and flexible membrane boundary.

33. The apparatus of claim 24, wherein said rigid member is a solid optically transparent mounting member for said flexible optically transparent membrane.

34. The apparatus of claim 24, wherein said rigid member supports the outer periphery of said flexible optically transparent membrane.

35. A method for controlling the distribution of a light beam. comprising:
 directing a light beam through a liquid cell lens having at least one flexible optically transparent membrane containing an optically transparent fluid, said membrane containing an array of microcells in fluid communication with each other; and controlling the amount of said optically transparent fluid communicated to and from said liquid cell lens so as to selectively deform the flexible optically transparent membrane in order to control the distribution of light in said beam.

36. The method of claim 35, further comprising arranging said microcells into separate regions wherein each region of said microcells controls the distribution of light in a separate portion of said beam.

37. The method of claim 35, further comprising separately controlling the amount of said optically transparent fluid communicated to each region of said microcells in order to separately control the distribution of light in different portions of said beam.

* * * * *